Aug. 6, 1968　　　E. GRANVILLE　　　3,395,766
POSTHOLE DIGGER

Filed March 9, 1965　　　　　　　　　3 Sheets-Sheet 3

INVENTOR.
EDWARD GRANVILLE
By Donald G. Dalton
Attorney

United States Patent Office 3,395,766
Patented Aug. 6, 1968

3,395,766
POSTHOLE DIGGER
Edward Granville, Yermo, Calif., assignor to United
States Steel Corporation, a corporation of Delaware
Filed Mar. 9, 1965, Ser. No. 438,283
5 Claims. (Cl. 173—23)

ABSTRACT OF THE DISCLOSURE

A posthole digger or other auxiliary appartus for intermittent operation by a continuously rotating power take-off shaft of a tractor or automotive vehicle. A posthole digger in the form of an earth auger having a swivel mounting on the end of a carriage mounted for sidewise movement on a conventional tractor or automotive vehicle to provide for its being centered by the operator of the vehicle in a vertical position over a hole to be dug thereby.

---

This invention relates to power take-off operated attachments for motor vehicles and, as indicated, to a posthole digger.

One object of the invention is to provide a power take-drive for motor vehicles which does not require operation of the vehicle motor clutch in order to obtain intermittent operation of auxiliary equipment driven thereby. To this end, the auxiliary equipment drive of this invention is effected through a conventional automotive differential of the type that has a pair of axially aligned axles connected by differential gearing with a power input drive shaft, which is rotated continuously by a power take-off shaft on the vehicle. One axle of the differential is equipped with a brake that operates to control rotation of its other axle which has a driving connection with the auxiliary equipment. When the brake is operated to hold the axle on which it is mounted against rotation, the differential gearing acts to rotate the other axle of the differential unit and thus operate the auxiliary equipment with which it is connected. In this manner, intermittent operation and speed regulation of the auixlary equipment are effected by operation of the differential brake without the necessity of operating the vehicle motor clutch.

Another object of the invention is to provide a posthole digger in which all adjustments and control operations can be performed by the driver of the vehicle without leaving the driver's seat. For this purpose the digger comprises an earth drill or auger mounted on one end of a carriage which is arranged in back of the driver's seat for lateral movement with respect to the vehicle and thus in a location such that the relative position of the auger with respect to the vehicle can be seen by the operator at all times. The mounting of the auger on the carriage further provides for its being tilted about pivot axes extending longitudinally and transversely of the vehicle so that it may be readily adjusted to a vertical position and accurately located along a fence-line. By reason of the location of the auger at one side of the vehicle and immediately behind the driver's seat, all operations required for centering it in a vertical position over a predetermined point at which a posthole is to be dug can be performed by the driver without leaving his seat on the vehicle. This arrangement of the apparatus reduces the time required for digging postholes to a minimum and further requires only a single operator for its most efficient use.

Other objects and advantages of the invention will be apparent from the following description.

In the drawings there is shown a preferred embodiment of the invention. In this showing:

Figure 1:
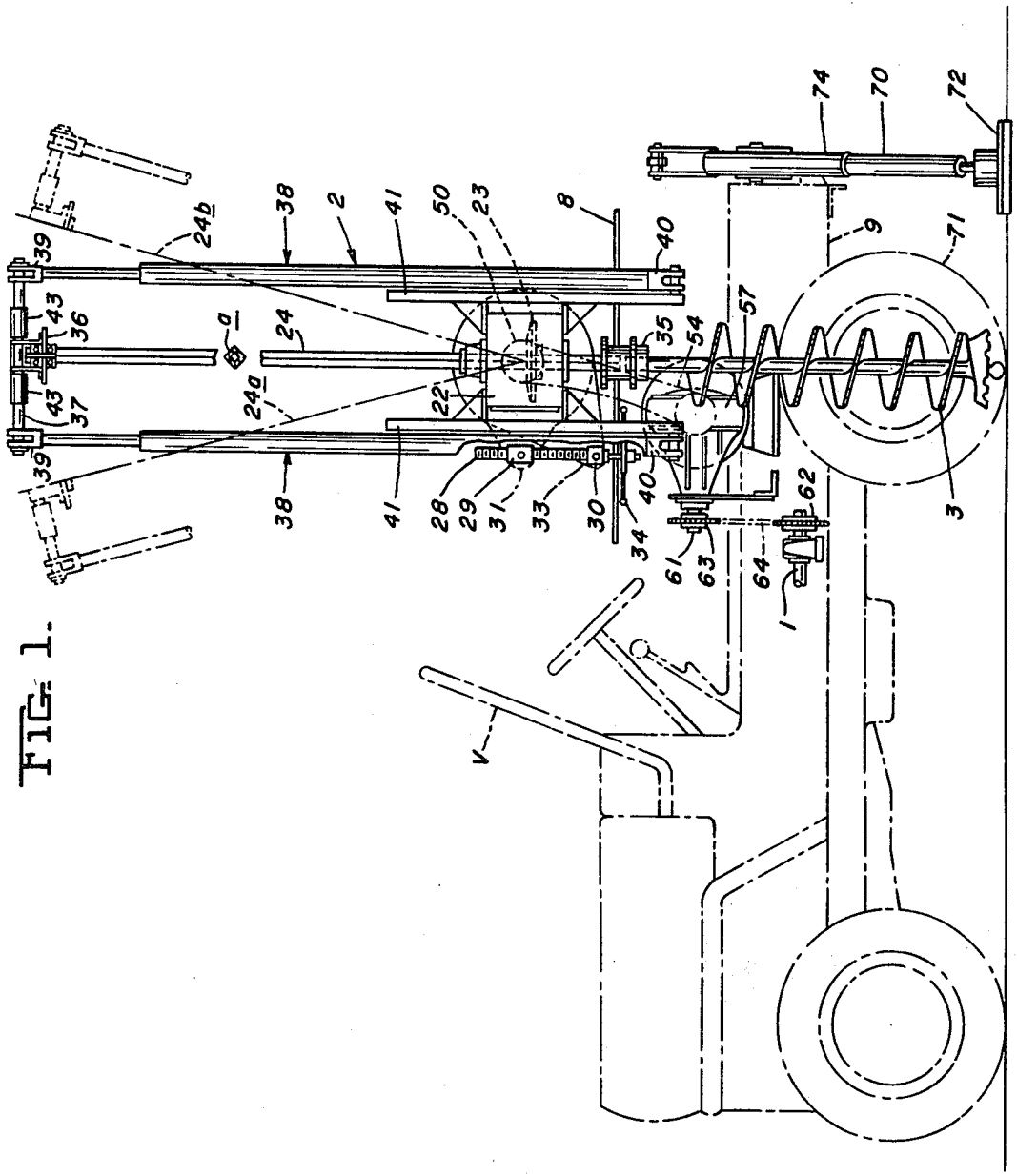
FIGURE 1 is a side elevational view showing the manner in which the apparatus of this invention is mounted on a motor vehicle.

The drawings show a preferred arrangement of the apparatus of this invention on a motor vehicle V which is shown diagrammatically in broken lines. Such vehicle is one of the type commonly known as a "Jeep" and is equipped with a power take-off shaft 1 having a driving connection (not shown) by which it is rotated continuously through the "Jeep" motor and its clutch. In a manner to be described the shaft 1 operates through the apparatus 2 of this invention to drive auxiliary equipment such as an earth drill or auger 3, which is suspended at one side of the vehicle immediately behind the driver's seat where its position relative to the vehicle may be readily observed by the driver of the vehicle.

The apparatus 2 comprises a carriage 4 on which the auger 3 is supported for movement in a transverse direction with respect to the vehicle V. The carriage 4 is a box-like structure of rectangular shape that has upper and lower pairs of spaced guide bars 5 extending longitudinally along its corner edges. Upper and lower sets of guide rollers 6 have rolling engagement with the guide bars 5 and operate the guide the movement of the carriage 4 along a path extending transversely with respect to the vehicle V. The guide rollers 6 are carried by a rectangular frame 7 which is mounted on a horizontal supporting plate 8. The plate 8 is secured to the chassis 9 of the vehicle by vertical plates 10 which extend downwardly from the plate 8 and are detachably or permanently fastened to the vehicle chassis 9. Lateral movement of the carriage 4 over the plate 8 to adjust the position of the auger 3 laterally with respect to the vehicle V is controlled by a hydraulic motor 12 which has one end pivotally connected by a clevis pin connection 13 to a bracket 14 secured to and extending outwardly from the plate 8 and has its other end pivotally connected by a clevis pin connection 15 to the carriage 4.

The driver for rotating the auger 3 comprises a drive shaft 16 which is mounted on the carriage 4 for movement therewith in an axial direction and extends centrally and longitudinally thereof. The shaft 16 is rotatably supported by bearings 17 which are in turn supported on the carriage 4 for movement therewith by plates 18 extending transversely with respect to the guide bars 5. The outer end of the shaft 16 is connected by a flexible coupling 19 and a universal joint 20 in driving relation with a pinion 21 in a gear box 22. The pinion 21 drives gear 23 which is rotatably supported in the gear box 22 and imparts rotation to a kelly bar 24.

The mounting of the gear box 22 on the carriage 4 provides for its movement therewith and for its pivotal movement about the axis of the shaft 16 and pinion 21, so that the kelly bar 24 and auger 3 may be moved to a position in which their axis and the axis of the drive shaft 16 lie in a common vertical plane. The gear box mounting for this purpose comprises a plate 25 rigidly secured to the end of the carriage 4 for movement therewith and a plate 26 which has an end-thrust rotatable connection (not shown), such as an annular end thrust bearing having a central opening through which the drive connection between the universal joint 20 and pinion 21 extends, providing for its axial movement with the plate 25 and the carriage 4 and for rotational movement relative thereto. The inner end 27 of the gear box 22 is secured to the plate 26 for rotation therewith about the axis of the shaft 16. The plates 25 and 26 have central openings (not shown) through which the drive connection between the universal joint 20 and the pinion 21 extends. The mechanism for adjusting the rotational position of the plate 26 and thereby the gear box 22 relative to the plate 25 comprises a threaded shaft 28 which has a nut 29 in threaded engagement therewith and a thrust collar 30 rotatably supported in a fixed axial position on one end thereof. The nut 29 is pivotally supported on an extension 31 of the plate 25 and the collar 30 is pivotally supported on an extension 33 of the plate 26. In this manner, rotation of the shaft 28 by the hand wheel 34 at its lower end operates to vary the axial spacing between the nut 29 and the collar 30 to thereby adjust the rotational position of the plate 26 and the gear box 22 relative to the plate 25. Adjustment of the rotational position of the gear box 22 in this manner operates to pivot the kelly bar 24 over an arcuate path between positions indicated by the broken lines 24a and 24b in FIGURE 1 to thereby move the auger 3 to a vertical position in a manner to be described.

A coupling 35 connects the upper end of the auger 3 to the lower end of the kelly bar 24 for rotation thereby. The kelly bar 24 has a square cross-sectional shape, as shown at a in FIGURE 1, and is movable axially through aligned openings in the gear box 22 and its drive gear 23 to provide for axial movement of the auger 3 into and out of a posthole dug thereby. The upper end of the kelly bar 24 is rotatable in a thrust bearing 36 which connects it to a cross-bar 37 for vertical movement thereby to raise the auger 3 out of a posthole. Vertical movement is imparted to the cross-bar 37 for this purpose by a pair of laterally spaced and parallel hydraulic motors 38 which respectively have the upper ends 39 of their pistons pivotally connected to opposite ends of the cross-bar 37 and pivotal connections 40 at the lower ends of their cylinders with the lower ends of supporting brackets 41 which are secured to opposite sides of the gear box 22. Upon operation of the motors 38 to move their respective piston ends 39 upwardly, the cross-bar 37 and kelly bar 24 are elevated and the auger 3 is thus raised out of a hole dug thereby. During a digging operation of the auger 3, the motors 38 operate to permit or assist the lowering movement of the auger 3 as its drilling operation proceeds. Conventional valve mechanisms (not shown) and a source of hydraulic fluid under pressure are provided for controlling operation of the motors 38 to raise and lower the cross-bar 37 and thereby the kelly bar 24 and auger 3.

A Y-yoke 42 having arms 43 rotatably connected with the cross-bar 37 on opposite sides of its connection to the thrust bearing 36 is provided for preventing rotation of the cross-bar 37 by torque transmitted thereto through the thrust bearing 36 by rotation of the kelly bar 24. To prevent rotation of the yoke 42, its inner end 44 has sliding engagement in a link 45 on the upper end of a mast 46 which has its lower end supported on a member 47 (FIGURE 3) which forms a part of the carriage frame 7. The mast 46 is braced against movement out of its vertical position by reinforcing bars 48 that have their upper ends connected to the mast 46 and their lower ends connected to the frame member 47 or to a second member 49 which forms part of the frame 7 at the central portion thereof.

The drive for rotating the shaft 16 and thereby the auger 3 comprises a driven sprocket 50 which has a splined or keyed connection with the shaft 16 for axial movement relative thereto. The sprocket 50 is rotatably supported by a thrust bearing 51 which is carried by a stationary bracket 52 suspended from the frame member 49. The thrust bearing 51 holds the driven sprocket 50 against axial movement during endwise movement of the carriage 4 by the motor 12.

The driven sprocket 50 is connected by a sprocket chain 54, which is shown diagrammatically in broken lines and extends through an opening in the mounting plate 8, for rotation by a sprocket 55 keyed on the end of an axle 56 of a differential unit 57 which is supported by brackets 58 on the vehicle chassis 9. The differential unit 57 is a conventional automotive differential of the type having a second axle 60 which is axially aligned and connected with the axle 56 through conventional differential gearing (not shown) that is operated by a power input drive shaft 61. The input drive shaft 61 is rotated continuously by the vehicle take-off shaft 1 through a chain and sprocket drive which includes a sprocket 62 on the shaft 1 and a sprocket 63 on the shaft 61, the sprockets 62 and 63 being connected by a sprocket chain 64 shown diagrammatically in broken lines. A brake 65 is mounted on the housing 66 of the unit 57 and operates to brake the rotation of the axle 60 and thereby control the rotation of the axle 56 driving the auger 3. When the brake 65 is released, the load of the auger 3 and associated drive parts on the sprocket 55 will be sufficient to hold the axle 56 against rotation and, under this condition, the axle 60 will rotate freely. When the brake 65 is operated to hold the axle 60 against rotation, the differential 57 will operate to rotate the shaft 56 and the sprocket 55 thereon. A partial application of the brake 65 will be effective only to slow the rotation of the axle 60 and thereby rotate the axle 56 at a slower rate.

Figure 2:
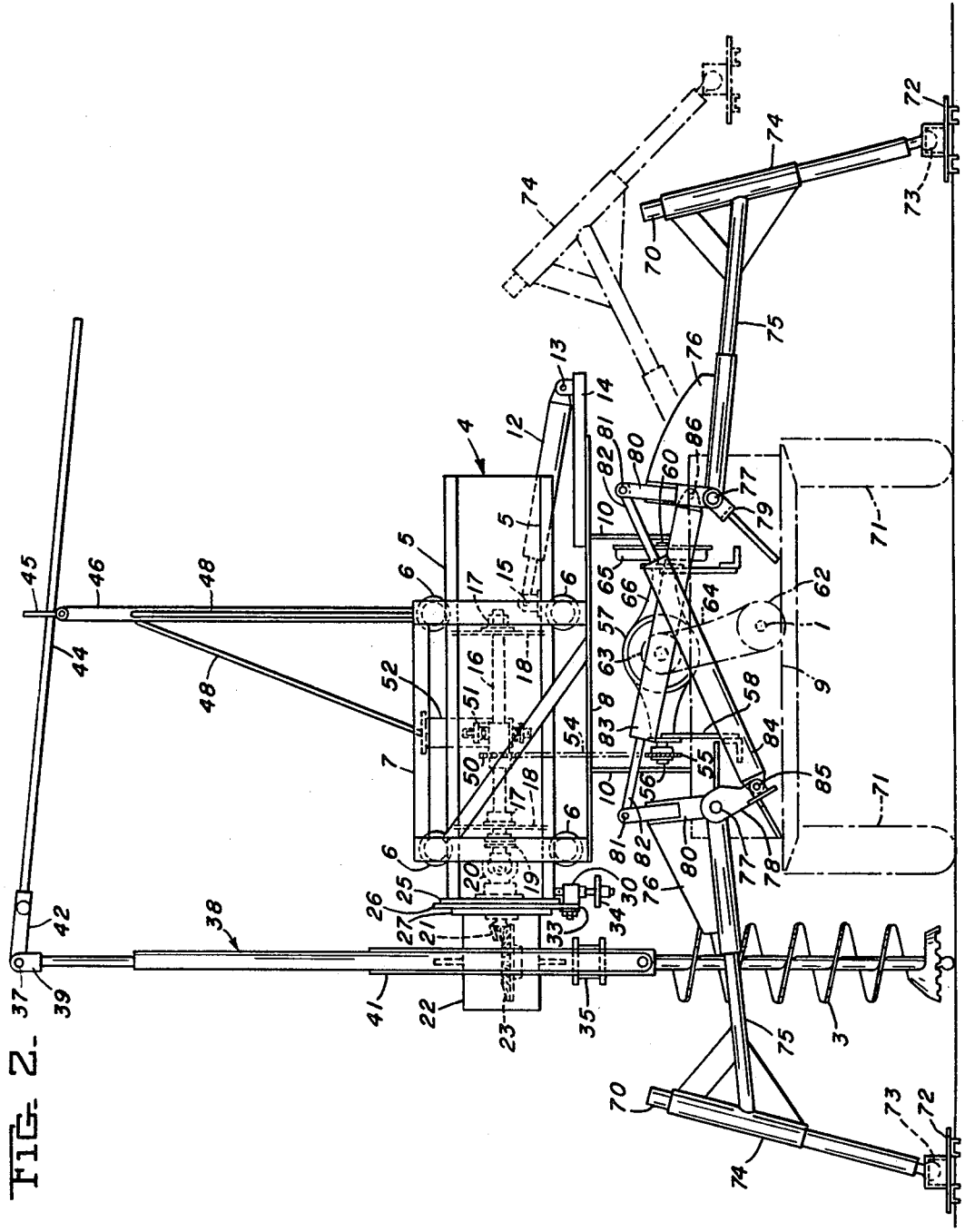
FIGURE 2 is an end eelvational view taken in a direction looking toward the rear of the vehicle and from the right of FIGURE 1.
Figure 3:
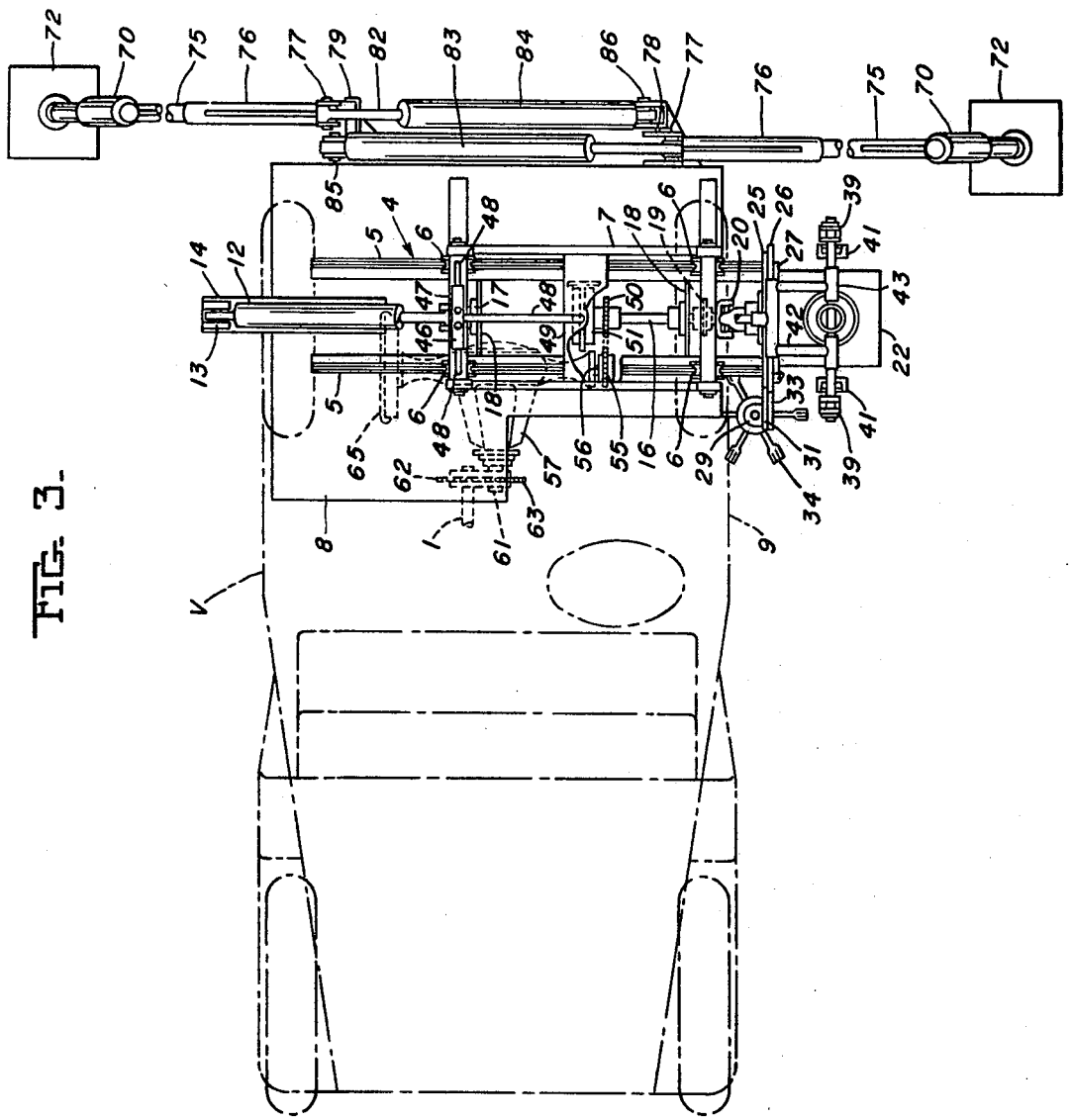
FIGURE 3 is a plan view of the apparatus shown in FIGURES 1 and 2.

A pair of outriggers 70 of identical construction are provided on opposite sides of the vehicle for tilting the chassis 9 about the longitudinal center-line of the vehicle V to move the supporting plate 8 to a horizontal position and thus compensate for the transverse slope of the ground on which its wheels 71 are supported. Each of the outriggers 70 comprises a bearing pad 72 for engaging the surface of the ground and which has a swivel connection 73 with the lower end of a force transmitting member 74. The members 74 are mounted on the outer ends of horizontal arms 75 of bell crank levers 76 which have pivotal connections 77 with stationary brackets 78 and 79 respectively on opposite sides of the chassis 9. Each of the bell crank levers 76 has a second arm 80 projecting upwardly from its mounting pivot 77 and which provides an operating arm through which operation of the outriggers 70 is effected. The upper ends of the bell crank levers 80 are pivotally connected at 81 with piston rods 82 which project respectively from the cylinders of hydraulic expansible chamber motors 83 and 84, which have pivotal connections 85 and 86 with the brackets 78 and 79 on opposite sides of the chassis 9 as best shown in FIGURE 3. Upon operation of the hydraulic motors 83 and 84 to move their pistons 82 to retracted positions in the cylinders 83 and 84, the bell cranks 76 are rotated in opposite directions to raise the bearing pads 72 to an elevated position as shown in broken lines at the right of FIGURE 2. When the vehicle is in a position for digging a posthole, the hydraulic motors the operated to move the pistons 82 to extended positions and thus rotate the bell cranks 76 to lower the pads 72 to positions engaged with the surface of the ground as shown in solid lines in FIGURE 2. After engagement of the pads 72 with the ground, subsequent operation of one of the bell cranks 76 will operate to tilt the chassis 9 to a horizontal position if the ground on which the wheels 71 is supported has a slope in a sidewise or transverse direction relative to the vehicle.

In operation, the apparatus 2 and the auger 3 are moved successively by the vehicle V to positions along a fence-line at which postholes are to be dug. At these positions, the auger 3 is centered vertically over a posthole to be dub by first operating the hand wheel 34 to tilt the auger about the axis of the shaft 16 to a position in which its center-line lies in a vertical plane containing the axis of the shaft 16 and extending transversely with respect to the vehicle V. This adjustment is made to compensate for the grade of the ground surface on which the front and rear wheels of the vehicle are supported. Next the hydraulic motors 83 and 84 are operated to engage the outrigger bearing pads 72 with the surface of the ground and tilt the chassis 9 to a horizontal position and thus compensate for any slope of the ground surface in a transverse direction relative to the vehicle. When the auger 3 has been moved to a vertical position in this manner, the hydraulic motor 12 is operated to adjust the position of the carriage 4 in a transverse direction relative to the vehicle V to a position in which the auger 3 is centered over the fence-line and the position of the posthole to be drilled thereby. The differential brake 65 is then operated to hold the axle 60 against rotation and thereby rotate the driving axle 56 and the sprocket 55 thereon and thus rotate the auger 3. The hydraulic motors 38 are then operated to lower the kelly bar 24 and thus to move the lower end of the auger 3 into drilling engagement with the ground. After a posthole has been dug by the auger 3 to the desired depth, the motors 38 are actuated to elevate the crossbar 37 and thus raise the kelly bar 24 to a position in which the auger 3 is clear of the upper end of the post hole which has been dug thereby. The vehicle V is then moved forwardly along the fence-line to the position where the next posthole is to be dug and at which the operations described above are repeated.

It will of course be understood that conventional valve mechanisms and a source of hydraulic fluid pressure are provided for operating each of the hydraulic motors 12, 38, 83, and 84. It will also be understood that the valve control mechanisms for such motors are located in a position where they can be operated by the driver of the vehicle V without leaving the driver's seat. The location of the valve mechanisms adjacent the driver's seat in this manner together with the location of the auger at one side of the vehicle V in a position immediately behind the driver's seat enable the auger to be readily seen by the driver so that all operations required for centering the auger in a vertical position over a posthole to be dug can be performed by the driver without leaving his seat on the vehicle. It will thus be apparent that the apparatus of this invention requires only one operator and that since all control operations can be performed by such operator from the driver's seat the time required for digging successive postholes is reduced to a minimum.

While one embodiment of my invention has been shown and described, it will be apparent that adaptations and modifications may be made without departing from the scope of the appended claims.

I claim:

1. A posthole digger comprising a support mounted on an automotive vehicle chassis for movement thereby along a fence-line, a carriage on said support movable over a path extending in a sidewise direction with respect to said vehicle, said carriage having one end thereof projecting beyond one side of said vehicle chassis, an auger, means mounting said auger on the said one end of said carriage with its axis extending transversely with respect to the said path of carriage movement, said auger mounting means including means supporting it for pivotal movement about an axis extending in the direction of the said path of carriage movement, separate means respectively for pivoting said auger with respect to said carriage and for adjusting the position of said carriage on said support to center said auger vertically over a posthole to be dug thereby, and means for tilting said support about a line extending longitudinally of said vehicle to move said support to a horizontal position in which the axis of said auger extends vertically, said tilting means comprising a pair of bell cranks respectively pivoted on opposite sides of the chassis of said vehicle with one arm extending upwardly and the other arm extending outwardly, bearing pads suspended from the outer ends of said outwardly extending arms for engaging the surface of the ground on which said vehicle is supported, and hydraulic motors connected with the upper ends of said upwardly extending arms for pivoting said bell cranks to engage said pads with the ground to tilt said vehicle chassis and thereby move said support to said horizontal position.

2. A posthole digger attachment for an automotive vehicle comprising a support adapted to be mounted on said vehicle for movement thereby along a fence-line, a carriage mounted on said support for movement in a sidewise direction with respect to said vehicle, said carriage having one end thereof projecting beyond one side of said vehicle, an auger, means mounting said auger on the said one end of said carriage with its axis extending transversely with respect to the path of carriage movement, said auger mounting means including means supporting it for pivotal movement about an axis extending in the said endwise direction of carriage movement, separate means respectively for pivoting said auger with respect to said carriage and for adjusting the position of said carriage on said vehicle chassis to center said auger vertically over a posthole to be dug thereby, and means for rotating said auger comprising a drive shaft rotatably supported on said carriage for movement therewith in an axial direction, a sprocket drive for rotating said shaft including a driven sprocket in a fixed axial position on said support and having a splined connection with said drive shaft and a driving sprocket, and an intermittently operable drive means for said sprocket drive comprising an automotive differential transmission of the type having an input drive shaft and a pair of axles operated thereby through differential gearing, means mounting said driving sprocket on one of said axles for rotation thereby, and a brake controlling the rotation of the other of said axles and thereby the rotation of said one axle and driving sprocket thereon to operate said auger.

3. An intermittent drive for automotive auxiliary equipment comprising, the combination with a power take-off drive shaft on a motor vehicle, of drive means for operating said equipment from said drive shaft comprising an automotive differential transmission of the type having an input drive shaft and a pair of axles operated thereby through differential gearing, means connecting said input drive shaft for rotation by said motor vehicle power take-off drive shaft, means connecting said auxiliary equipment for operation by one of said axles, and a brake controlling rotation of the other of said axles and thereby the operation of said auxiliary equipment by said one axle.

4. A posthole digger comprising an auger, a carriage supported for movement over a rectilinear path, means mounting said auger on one end of said carriage with its axis extending transversely with respect to said path, said mounting means including means for pivoting said auger about the said one end of said carriage to adjust the vertical position of its said axis with respect thereto, and means for rotating said auger comprising a drive shaft rotatably supported on said carriage for movement therewith in an axial direction, a sprocket drive for rotating said shaft including a driven sprocket held against axial movement and having a splined connection with said drive shaft, and a driving sprocket, and an intermittently operable drive means for said sprocket drive comprising an automotive differential transmission of the type having an input drive shaft and a pair of axles operated thereby through differential gearing, means mounting said driving sprocket on one of said axles for rotation thereby, and a brake on the other of said axles for controlling its rotation and thereby the rotation of said auger through said one axle and driving sprocket.

5. In apparatus of the character described, the combination with a support mounted on a motor vehicle chassis for movement thereby over the ground, of means for tilting said support about a line extending longitudinally of said chassis to move said support to a horizontal position comprising a pair of bell cranks respectively pivoted on opposite sides of the chassis of said vehicle with one arm extending upwardly and the other arm extending outwardly, bearing pads suspended from the outer ends of said outwardly extending arms for engaging the surface of the ground on which said vehicle is supported, and hydraulic motors connected with the upper ends of said upwardly extending arms for pivoting said bell cranks to engage said pads with the ground to tilt said vehicle and thereby move said support to said horizontal position.

References Cited

UNITED STATES PATENTS

| | | | |
|---|---|---|---|
| 10,952 | 5/1854 | Adams | 173—420 |
| 2,565,224 | 8/1951 | Gibbens | 173—22 |
| 2,602,637 | 7/1952 | Talbot | 173—25 |
| 2,852,992 | 9/1958 | Simmonds | 173—22 |
| 3,194,414 | 7/1965 | Tourneau | 212—145 |
| 3,225,842 | 12/1965 | Roeschen | 173—73 |
| 3,215,282 | 11/1965 | Wiemann et al. | 212—145 |
| 1,539,908 | 6/1925 | Moore | 173—26 |
| 2,655,006 | 10/1953 | Hoen et al. | 173—20 |

ERNEST R. PURSER, *Primary Examiner.*